US009198031B2

United States Patent
Ashley et al.

(10) Patent No.: US 9,198,031 B2
(45) Date of Patent: Nov. 24, 2015

(54) MANAGING DISTRIBUTION OF SOFTWARE UPDATES IN NEAR FIELD COMMUNICATION (NFC) MOBILE DEVICES

(71) Applicant: International Business Machines Corporation, Armonk, NY (US)

(72) Inventors: Paul A. Ashley, Toowong (AU); Anthony M. Butler, Dubai (AE); Ravi Kothari, New Delhi (IN); Yu-Chen Lin, New Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/297,727

(22) Filed: Jun. 6, 2014

(65) Prior Publication Data

US 2015/0126110 A1    May 7, 2015

Related U.S. Application Data

(63) Continuation of application No. 14/074,105, filed on Nov. 7, 2013.

(51) Int. Cl.
*H04B 5/00* (2006.01)
*H04W 8/24* (2009.01)
*H04W 4/00* (2009.01)

(52) U.S. Cl.
CPC .............. *H04W 8/245* (2013.01); *H04W 4/008* (2013.01)

(58) Field of Classification Search
CPC ........................................................ H04B 5/02
USPC ......................................................... 455/41.1
See application file for complete search history.

(56) References Cited

U.S. PATENT DOCUMENTS

| | | |
|---|---|---|
| 2005/0204060 A1 | 9/2005 | Maekawa et al. |
| 2010/0190437 A1* | 7/2010 | Buhot .......................... 455/41.1 |
| 2011/0161912 A1* | 6/2011 | Eteminan et al. ............. 717/101 |
| 2011/0185354 A1* | 7/2011 | Tanner et al. ................. 717/178 |
| 2012/0166338 A1* | 6/2012 | Agnelli et al. .................. 705/44 |
| 2012/0304254 A1* | 11/2012 | Musfeldt et al. .................. 726/2 |
| 2013/0017784 A1* | 1/2013 | Fisher .......................... 455/41.1 |
| 2013/0084800 A1* | 4/2013 | Troberg et al. ............... 455/41.1 |

(Continued)

OTHER PUBLICATIONS

List of IBM Patents or Patent Applications Treated As Related—Date Filed: Nov. 7, 2013; 1 page.

(Continued)

*Primary Examiner* — April G Gonzales
(74) *Attorney, Agent, or Firm* — Cantor Colburn LLP; Chi Xu

(57) ABSTRACT

A method, system and a computer program product for managing distribution of software updates in Near Field Communication (NFC) mobile devices includes retrieving information of one or more softwares in one or more NFC mobile devices by a NFC reader in communication range with the one or more NFC mobile devices, transmitting the retrieved information from the NFC reader to a distribution server which determines if the one or more softwares requires an update based on the retrieved information, in response to said determination, receiving an available updated software or update components of the one or more softwares from the distribution server to the NFC reader and transmitting thereof from the NFC reader to a secure element of the one or more NFC mobile devices whose one or more softwares require an updation.

14 Claims, 5 Drawing Sheets

(56) References Cited

U.S. PATENT DOCUMENTS

2013/0111461 A1* 5/2013 Zubas et al. .................. 717/173
2014/0167978 A1* 6/2014 Popa et al. ............... 340/870.02

OTHER PUBLICATIONS

U.S. Appl. No. 14/074,105; Non-Final Office Action, Date Filed: Nov. 7, 2013; Date Mailed: Apr. 14, 2015; 13 pages.

* cited by examiner

US 9,198,031 B2

MANAGING DISTRIBUTION OF SOFTWARE UPDATES IN NEAR FIELD COMMUNICATION (NFC) MOBILE DEVICES

CROSS-REFERENCE TO RELATED APPLICATION

This application is a continuation of U.S. patent application Ser. No. 14/074,105, filed Nov. 7, 2013, the content of which is incorporated by reference herein in its entirety.

BACKGROUND

The present invention relates to managing distribution of software updates in Near Field Communication (NFC) mobile devices.

In a Near Field Communication (NFC) ecosystem, a distribution server managed by a third party acts as an intermediary between an Application Provider (AP), Mobile Network Operator (MNO) and NFC mobile device. A user of the NFC mobile device subscribes to the NFC mobile services of the MNO. The user of the NFC mobile device requests mobile applications from the AP. These will be deployed by the distribution server Over-the-Air (OTA) to a Secure Element of the NFC mobile device.

One of the biggest challenges today for MNOs is how can the AP (via the distribution server) push out updates to a very large population of NFC mobile devices in a timely and optimum manner. There may be millions of NFC mobile devices that require a mobile application update. The OTA bandwidth is quite limited, and hence communicating a software update to a large number of NFC mobile devices in a timely fashion without overloading the MNO's network can be difficult if not impossible to achieve. The Global Platform Standards currently provide no alternative to having the distribution server deploy the mobile application or OS update to each NFC mobile device OTA in turn. A new approach therefore is required to enable large scale software updates to make to NFC mobile devices.

SUMMARY

A method, system and a computer program product for managing distribution of software updates in Near Field Communication (NFC) mobile devices includes retrieving information of one or more softwares in one or more NFC mobile devices by a NFC reader in communication range with the one or more NFC mobile devices, transmitting the retrieved information from the NFC reader to a distribution server which determines if the one or more softwares requires an update based on the retrieved information, in response to said determination, receiving an available updated software or update components of the one or more softwares from the distribution server to the NFC reader and transmitting thereof from the NFC reader to a secure element of the one or more NFC mobile devices whose one or more softwares require an updation.

According to an embodiment, the softwares includes an Operating System of the NFC mobile device and mobile applications in the NFC mobile device and the retrieval includes requesting and receiving the information from the NFC mobile device and the information includes information regarding one or more softwares and a distribution server identifier thereof. The software information is transmitted to the distribution server identified from the distribution server identifier. The updated software or update components received from the distribution server by the NFC readers is cryptographically protected.

Another embodiment of the invention includes transmitting the updated software or update components from the NFC reader to a temporary staging area of the secure element wherein the updated software or update components are moved from the temporary staging area to a production area of the secure element by the distribution server; and the installation of the updated software or update components in the production area of the secure elements is initiated by the distribution server, wherein the temporary staging area and production area being virtual memory partitions of the secure elements. The updated software or update components are verified before storing in the temporary and permanent staging areas by verification applications installed in the temporary and permanent staging areas respectively.

DETAILED DESCRIPTION

Figure 1:
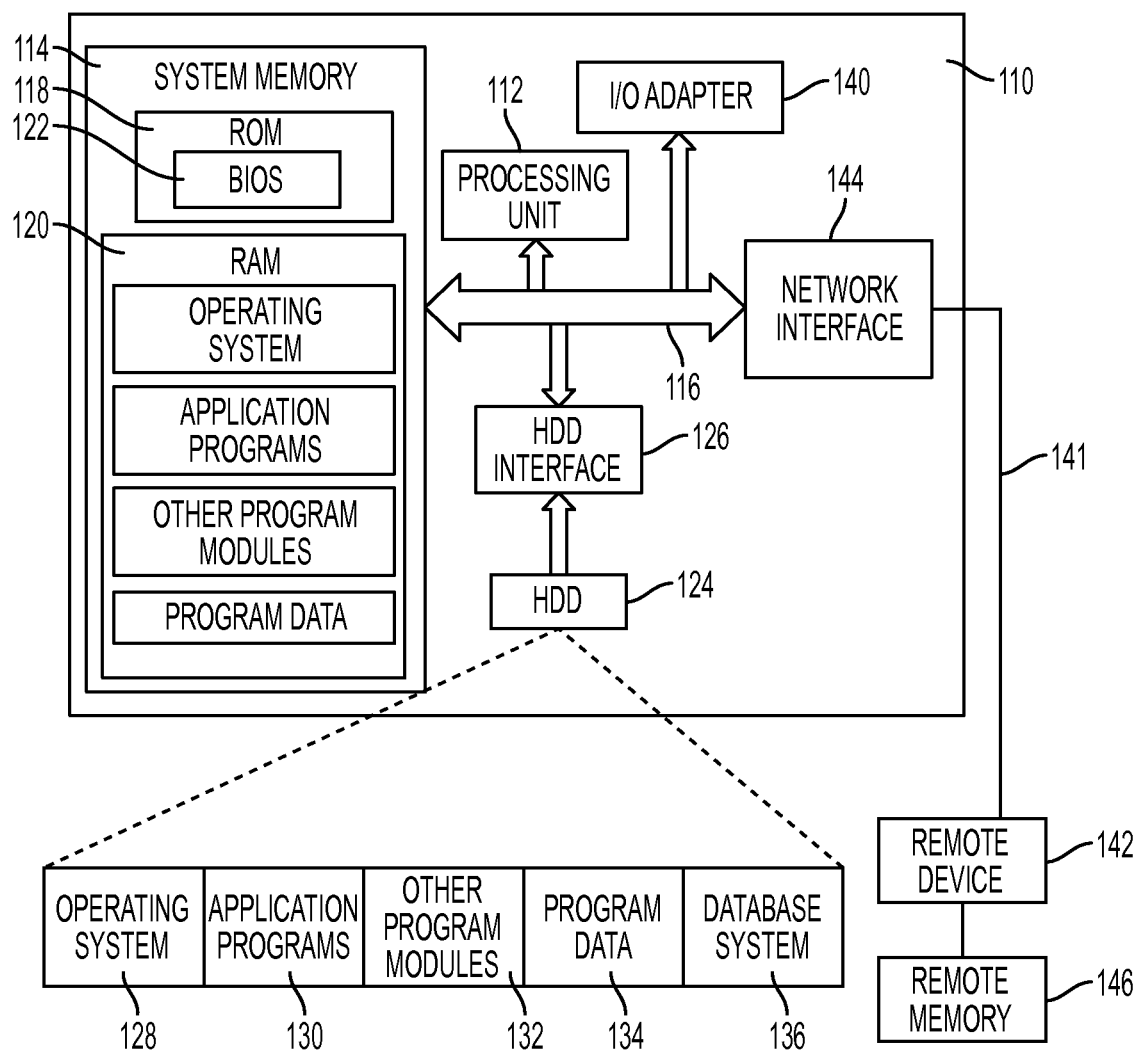
FIG. 1 illustrates a block diagram of a computing system for implementing embodiments of the present invention.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware embodiments that may all generally be referred to herein as a "circuit," "module" or "system." Furthermore, embodiments of the present invention may take the form of a computer program product, embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a block diagram of a computing system for implementing an embodiment of the present invention. The computing system includes a computing device 110, which in turn includes a processing unit 112, a system memory 114, and a system bus 116 that couples various system components including the system memory 114 to the processing unit 112. The system bus 116 may be any of several types of bus architectures, including a memory bus, a memory controller, a peripheral bus, and a local bus using any of a variety of bus architectures, such as PCI. The system memory 114 includes a Read Only Memory (ROM) 118 and a Random Access Memory (RAM) 120. A Basic Input/Output System (BIOS) 122, containing the basic routines that help to transfer information between elements within the computing device 110, such as during start-up, is stored in the ROM 118. The computing device 110 further includes a Hard Disk Drive (HDD) 124 as computer-readable storage media. The HDD 124 is connected to the system bus 116 by an HDD interface 126. The HDD 124 provides a non-volatile storage for computer-readable instructions, data structures, program modules, and other data for the computing device 110. Although the exemplary environment described herein employs the HDD 124, it should be appreciated by those skilled in the art that other types of computer-readable storage media, which can store data that is accessible by computer, such as RAM, ROM, removable magnetic disks, removable optical disks, and the like may also be used in the exemplary operating environment.

A number of program modules may be stored on the HDD 124, including an operating system 128, one or more application programs 130, other program modules 132, program data 134, and a database system 136. The operating system 128, the one or more application programs 130, the other program modules 132 and program data 134 may be loaded onto the system memory 114 and specifically onto the RAM 120 during the functioning of the computing device 110. A user may provide commands and information through input devices, such as a keyboard, and receive output through peripheral output devices, such as monitor, speaker, printer, etc. These input and output devices are often connected to the processing unit 112 through an I/O adapter 140 coupled to the system bus 116.

In a networked environment, the computing device 110 may be connected to a remote computing device 142 through a network interface card 144. It will be appreciated that the network connections shown are exemplary, and any conventional means 141 of establishing communications links between the computers, such as a local area network, wide area network or wireless connection, may be used. In a networked environment, program modules depicted relative to the computing device 110, or its components, may be stored in a remote memory 146. The remote computing device 142 may be a personal computer, a router, a server, a network PC, a peer device, or other common network device.

Figure 2:
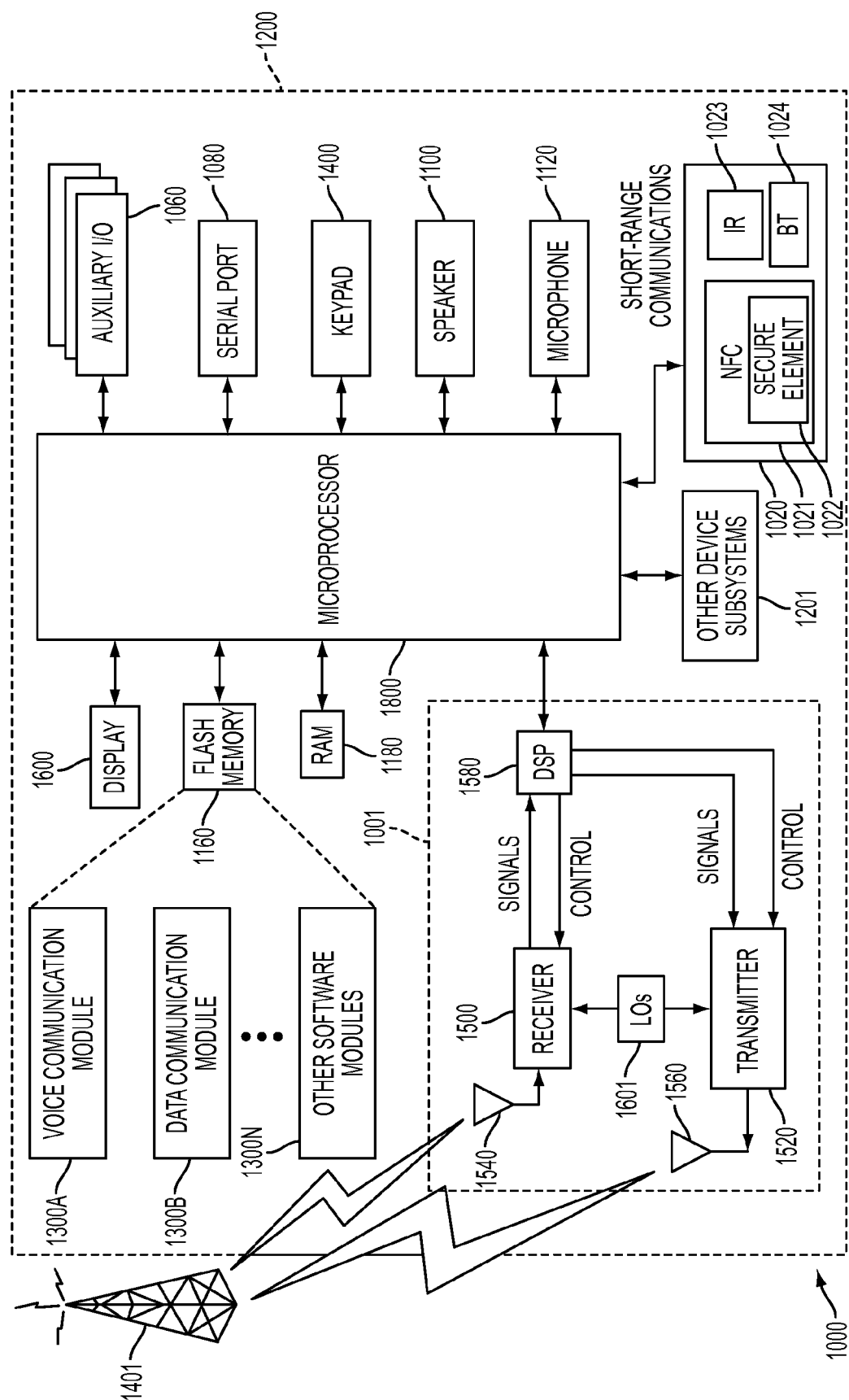
FIG. 2 is a schematic block diagram illustrating example components of an NFC mobile device that may be used to implement an embodiment of the invention.

Those of the ordinary skill in the art will appreciate that the hardware in FIG. 1 is a basic computing system and may vary. The architecture of the aforementioned computing device is not limiting and is only depicted as an example on which an embodiment of the present invention may be implemented. Other types of computing system such as a smart phone or a web-kiosk are well within the intended scope on which an embodiment of the present invention may be implemented FIG. 2 is a schematic block diagram illustrating example components of an NFC enabled mobile device that may be used to implement an embodiment of the invention. Example components of a NFC enabled mobile device 1000 that may be used in accordance with an example embodiment are further described below with reference to FIG. 4. The NFC enabled mobile device 1000 illustratively includes a housing 1200, a keyboard or a keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

In addition to the processing device 1800, other parts of the mobile device 1000 are shown schematically in FIG. 1. These include a communications subsystem 1001, a short-range communications subsystem 1020, the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOS) 1601. The specific design and implementation of the communications subsystem 1001 is dependent upon the communications network in which the mobile device 1000 is intended to operate. For example, a mobile device 1000 may include a communications subsystem 1001 designed to operate with the General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, etc.

Network access requirements vary depending upon the type of communication system. For example, in GPRS networks, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem 1020 includes NFC (Near field communication) 1021 capability. NFC 1021 capability includes a secure element 1022 therein to securely store applications and/or credentials and provide for secure execution of applications. The secure element 1022 (secure memory and execution environment) is a dynamic environment in which application code and application data can be securely stored and administered and in which secure execution of applications occur. The secure element 1022 resides in highly secure crypto chips (usually a smart card chip). The secure element 1022 provides delimited memory for each application and other functions that can encrypt, decrypt, and sign the data packet. The secure element 1022 could be implemented either by a separate secure smart card chip (currently implemented in most of the NFC mobile devices), in the SIM/UICC (which is used by GSM mobile phone operators to authenticate subscribers on their networks and maintain personalized subscriber information and applications), or in an SD card that can be inserted in the mobile device. The secure element 1022 implementation approach is selected by the mobile operator implementing the service and/or by the payment service provider (for SD card implementations). Other short-range communications subsystem may include an infrared device 1023 and associated circuits and components or a Bluetooth™ communications module 1024 to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

Those of the ordinary skill in the art will appreciate that the hardware in FIG. 2 is a basic NFC mobile device and may vary. The architecture of the aforementioned NFC mobile device is not limiting and is only depicted as an example on which an embodiment of the present invention may be implemented.

Figure 3:
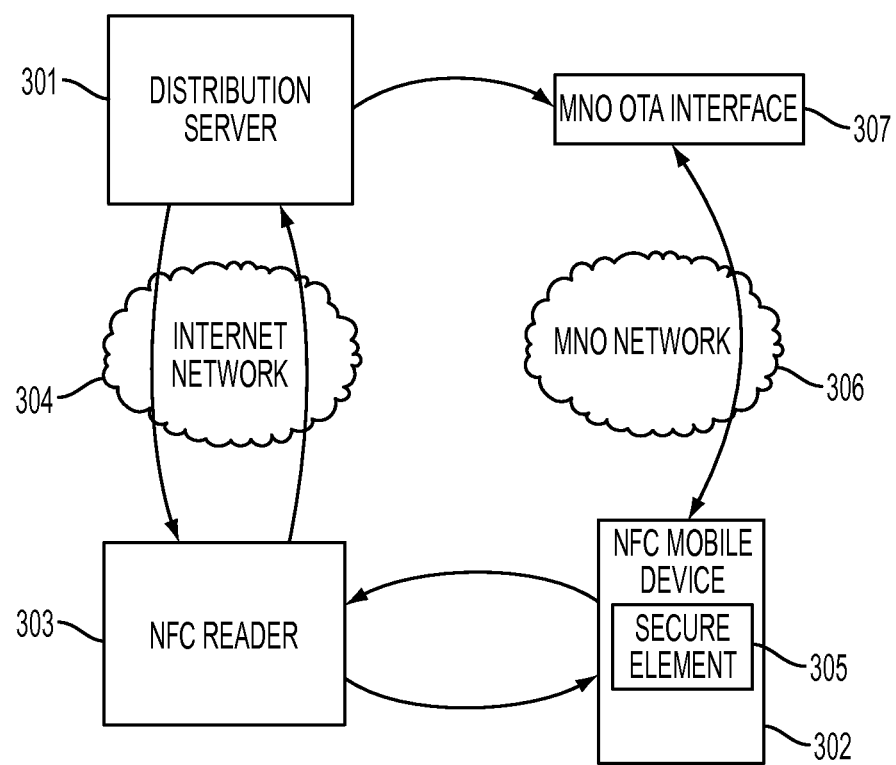
FIG. 3 illustrates a block diagram of a system for implementing embodiments of the present invention.

FIG. 3 depicts a system for implementing an embodiment of the present invention. A distribution server 301 is a trusted services manager which typically comprises computer system as depicted in FIG. 1 which manages distribution of updated software or update components (hereinafter referred to as updated software collectively) from an Application Provider (not shown) to the NFC mobile device 302 through the NFC server 303. Software includes mobile applications and underlying Operating System in the NFC mobile device 302. The APs of one or more softwares running on one or more NFC mobile devices 302 transmits an updated version thereof or the updated software to the distribution server 301 to be distributed to the NFC mobile devices 302. The AP is a service provider using a computer system as shown in FIG. 1 to store and transmit the updated softwares to the distribution server 301.

The NFC reader 303, generally installed at public places, say railway stations, requests the NFC mobile device 302 in communication range therewith to retrieve certain information therefrom. Such information typically includes information of the softwares therein and a distribution server identifier thereof. This retrieval includes the NFC reader 303 seeking permission from the NFC mobile device 302 to read and fetch the information, a user of the NFC mobile device 302 granting permission thereof and subsequently the NFC mobile device 302 transmitting the information to the NFC reader 303 and the NFC reader 303 receiving thereof. The NFC reader 303 is a typical NFC reading device known and used widely and as such known to a person skilled in the art. The NFC mobile device 302 should support NFC reader/writer mode so as to be able to communicate with NFC readers (also called NFC tags). The communication is based on an RFID system, allowing very short range communication between two endpoints (less than 10 cm). A typical NFC reader 303 may comprise a computing system as described in FIG. 1 along with NFC read/write capability. The NFC reader 303 may be configured to retrieve information from a plurality of NFC mobile devices 302 in communication range therewith. The NFC reader 303 is further configured to communicate with the distribution server 301, preferably, through an internet network 304. The implementation of the internet network 304 may be through Virtual Private Network (VPN) or the like to establish a secure connection between the connection end points. After retrieving the information from the NFC mobile device 302, the NFC reader 303 transmits the aforementioned information to the distribution server 301 identified from the distribution server identifier.

The distribution server 301 checks whether the software whose information is received by it through the NFC reader 303 requires an update. Typically, this check is performed by comparing the version of the softwares in the mobile device 302 and the distribution server 301. The software version of the mobile device 302 is read from the information received by the distribution server 301. If yes, a cryptographically updated software or update components of the software is transmitted from the distribution server 301 and received by the NFC reader 303. Generally, the updated software is transmitted in a binary form thereof. Applying cryptographic protection to softwares before transmitting is a known art and typically performed by algorithms known to a person skilled in the art. If the distribution server 301 determines that there is no updated software available, the distribution server 301 informs the NFC reader 303 that the software whose information is received is up to date and requires no update. Subsequently, the NFC reader 303 passes on the same information to the NFC mobile device 302 from which the information was retrieved. It will be apparent to a person skilled in the art that the aforementioned operations by the distribution server 301 may be performed by incorporating a corresponding computing program code in the computing system (FIG. 1) of the distribution server 301.

The NFC reader 303 upon receiving the updated software from the distribution server 301 transmits it to a secure element 305 of the NFC mobile device 302 if it is in communication range therewith or whenever the NFC mobile device 302 comes in communication range therewith. As described earlier, the secure element 305 (secure memory and execution environment) is a dynamic environment in which application code and application data can be securely stored and administered and in which secure execution of applications occur. The secure element 305 resides in highly secure crypto chips (usually a smart card chip). The secure element 305 provides delimited memory for each application and other functions that can encrypt, decrypt, and sign the data packet. The secure element 305 could be implemented either by a separate secure smart card chip (currently implemented in most of the NFC mobile devices), in the SIM/UICC (which is used by GSM mobile phone operators to authenticate subscribers on their networks and maintain personalized subscriber information and applications), or in an SD card that can be inserted in the mobile devices. The secure element 305 implementation approach is selected by the MNO implementing the service.

It will be apparent to a person skilled in the art the NFC reader 303 is configured to remember identity of the NFC mobile device 302 from which the information was retrieved and transmitted to the distribution server 301. Similarly, when the updated software is received from the distribution server 301, the NFC reader 303 determines to which NFC mobile device(s) 302 the updated software(s) is to be transmitted. Such configuration may be achieved by executing relevant computer program codes within the NFC reader 303 by a person skilled in the art. Alternatively, the software information transmitted to the distribution server 301 may comprise an identity information of the NFC mobile device 302 and the distribution server 301 includes such identity information within the updated software which is read by the NFC reader 303 thus enabling the NFC reader 303 to transmit the updated software to the relevant NFC mobile device 302 whose identity information is within the received updated software. It will be apparent to a person skilled in the art that many such combinations are possible to implement the aforementioned operation and are well within the intended scope of this description. The NFC reader 303 seeks permission from the NFC mobile device 302, as is the general protocol, before transmitting the updated software thereto.

The secure element 305 is configured to notify the distribution server 301 as soon as it receives the updated software from the NFC reader 303. As is obvious, such a configuration may be achieved by adding/modifying the underlying computer program code within the secure element 305 governing the functioning thereof. The distribution server 301, upon being notified of the aforementioned, initiates installation of the updated software within the secure element 305. Before installing the updated software, the distribution server 301 may verify the integrity of the received updated software by the secure element 305. This may be done through specification verification applications executing within the secure element 305. The communication between the secure element 305 and the distribution server 301 is through the MNO using the MNO's OTA network 306. The MNO facilitates the aforementioned communication through a MNO OTA interface 307 which is typically a computer system shown in FIG. 1 configured to perform the aforementioned through various underlying computer program codes therein.

Figure 4:
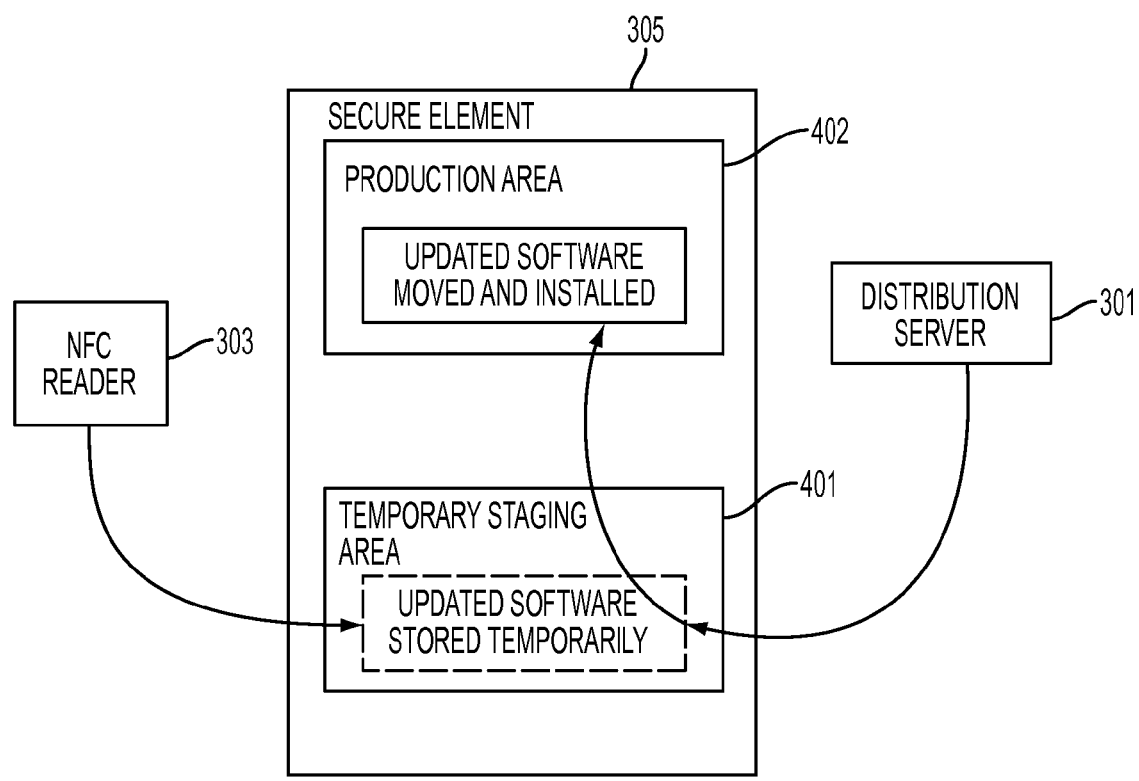
FIG. 4 illustrates a secure element of a NFC mobile device for implementing an embodiment of the invention.

According to another embodiment, as shown in FIG. 4, the secure element 305 of the NFC device 302 (as shown in FIG. 3) comprises a temporary staging area 401 and a production area 402 which are two virtual memory partitions within the secure element 305 wherein only the production area 402 is configured to execute or install the software whereas the role of the temporary staging area 401 is limited to only storing the software, more particularly the updated software. It will be apparent to a person skilled in that such a configuration of the memory of the secure element 305 may be achieved by adding/modifying the underlying computer program code of the secure element 305 by a person skilled in the art. According to the embodiment, the NFC reader 303 transmits the updated software to the temporary staging area 401 upon receiving the updated software from the distribution server 301. The distribution server 301 upon being notified of this moves the updated software from temporary staging area 401 to the production area 402 after verification thereof and subsequently initiates installation of the updated software within the production area 402 of the secure element 305. The advantage of using a temporary staging area 401 is that the updated software can be stored there until the NFC mobile device 302 returns to the MNO's OTA network 306 or a connection is established therewith. Only when the NFC mobile device 302 is back on the MNO's OTA network 306, will the NFC mobile device 302 be able to signal to the distribution server that the downloaded updated software can be installed. The distribution server 301 then initiates the installation of the update as described above.

Figure 5:
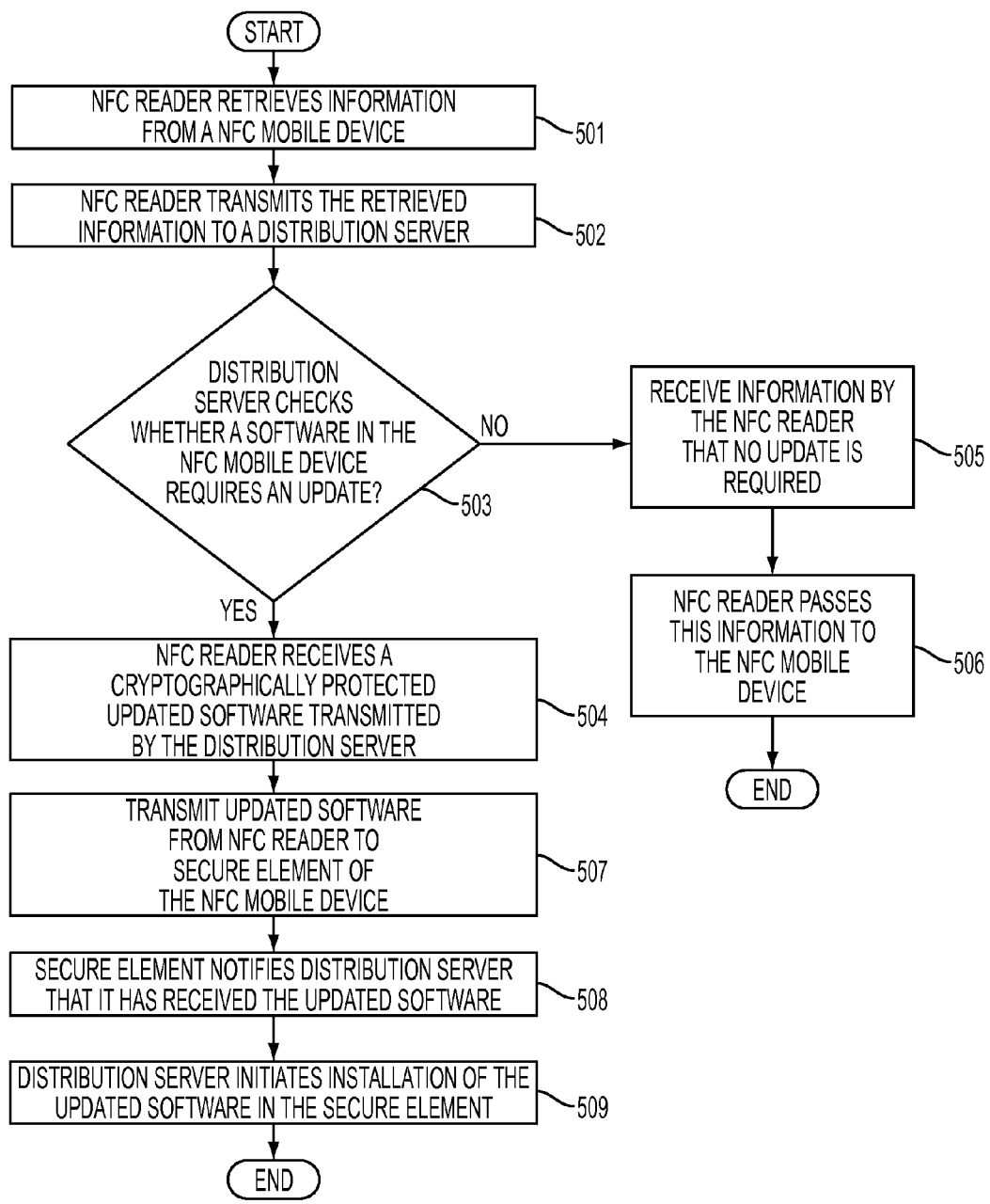
FIG. 5 illustrates a flowchart depicting steps to be performed for implementing an embodiment of the present invention.

FIG. 5 illustrates flowcharts depicting steps to be performed for implementing an embodiment of the present invention. At step 501, a NFC reader, generally installed at public places, say railway stations, requests a NFC mobile device in communication range therewith to retrieve certain information therefrom. Such information typically includes information of the softwares therein and a distribution server identifier thereof. This retrieval includes the NFC reader seeking permission from the NFC mobile device to read and fetch the information, a user of the NFC mobile device granting permission thereof and subsequently the NFC mobile device transmitting the information to the NFC reader and the NFC reader receiving thereof. The NFC reader is a typical NFC reading device known and used widely and as such known to a person skilled in the art. The NFC mobile device should support NFC reader/writer mode so as to be able to communicate with NFC readers (also called NFC tags). The communication is based on an RFID system, allowing very short range communication between two endpoints (less than 10 cm). A typical NFC reader may comprise a computing system as described in FIG. 1 along with NFC read/write capability. The NFC reader may be configured to retrieve information from a plurality of NFC mobile devices in communication range therewith. The NFC reader is further configured to communicate with a distribution server, preferably, through an internet network. The implementation of the internet network may be through Virtual Private Network (VPN) or the like to establish a secure connection between the connection end points.

At step 502, the NFC reader transmits the aforementioned information to the distribution server identified from the distribution server identifier. The distribution server is a trusted services manager which typically comprises a computer system as depicted in FIG. 1 which manages distribution of updated software or update components (hereinafter referred to as updated software collectively) from an Application Provider to the NFC mobile device through the NFC server. Software includes mobile applications and underlying Operating System in the NFC mobile device. The APs of one or more softwares running on one or more NFC mobile devices transmits an updated version thereof or the updated software to the distribution server to be distributed to the NFC mobile devices. The AP is typically a service provider using a computer system as shown in FIG. 1 to store and transmit the updated softwares to the distribution server.

At step 503, the distribution server checks whether the software whose information is received by it through the NFC reader requires an updation. Typically, this check is performed by comparing the version of the softwares in the mobile device and the distribution server. The software version of the mobile device is read from the information received by the distribution server. At step 504, if yes, a cryptographically updated software or update components of the software is transmitted from the distribution server and received by the NFC reader. Generally, the updated software is transmitted in a binary form thereof. Applying cryptographic protection to softwares before transmitting is a known art and typically performed by algorithms known to a person skilled in the art. At step 505, if no, the distribution server informs the NFC reader that the software whose information is received is up to date and requires no update. At step 506, the NFC reader passes on the same information to the NFC mobile device from which the information was retrieved.

At step 507, the NFC reader upon receiving the updated software from the distribution server transmits it to a secure element of NFC mobile device if it is in communication range therewith or whenever the NFC mobile device comes in communication range therewith. As described earlier, the secure element (secure memory and execution environment) is a dynamic environment in which application code and application data can be securely stored and administered and in which secure execution of applications occur. The secure element resides in highly secure crypto chips (usually a smart card chip). The secure element provides delimited memory for each application and other functions that can encrypt, decrypt, and sign the data packet. The secure element could be implemented either by a separate secure smart card chip (currently implemented in most of the NFC-enabled mobile devices), in the SIM/UICC (which is used by GSM mobile phone operators to authenticate subscribers on their networks and maintain personalized subscriber information and applications), or in an SD card that can be inserted in the mobile devices. The secure element implementation approach is selected by the MNO implementing the service.

It will be apparent to a person skilled in the art the NFC reader is configured to remember identity of the NFC mobile device from which the information was retrieved and transmitted to the distribution server. Similarly, when the updated software is received from the distribution server, the NFC reader determines to which NFC mobile device(s) the updated software(s) is to be transmitted. Such configuration may be achieved by executing relevant computer program codes within the NFC reader by a person skilled in the art. Alternatively, the software information transmitted to the distribution server may comprise an identity information of the NFC mobile device and the distribution server includes such identity information within the updated software which is read by the NFC reader thus enabling the NFC reader to transmit the updated software to the relevant NFC mobile device whose identity information is within the received updated software. It will be apparent to a person skilled in the art that many such combinations are possible to implement the aforementioned operation and are well within the intended scope of this description. The NFC reader seeks permission from the NFC mobile device, as is the general protocol, before transmitting the updated software thereto.

At step 508, the secure element notifies the distribution server as soon as it receives the updated software from the NFC reader. As is obvious, such a notification is made possible by configuring the underlying computer program code within the secure element governing the functioning thereof through relevant additions/modifications.

At step 509, the distribution server, upon being notified of the aforementioned, initiates installation of the updated software within the secure element. Before installing the updated software, the distribution server may verify the integrity of the received updated software by the secure element. This may be done through specification verification applications executing within the secure elements. The communication between the secure element and the distribution server is through the MNO using the MNO's OTA network. The MNO facilitates the aforementioned communication through a MNO OTA interface which is typically a computer system shown in FIG. 1 configured to perform the aforementioned through various underlying computer program codes therein.

According to another embodiment, the NFC reader transmits the updated software to a temporary staging area of the secure element upon receiving the updated software from the distribution server. The distribution server upon being notified of this moves the updated software from temporary staging area to a production area of the secure element after verification thereof and subsequently initiates installation of the updated software within the production area of the secure element. The temporary staging area and production area are two virtual memory partitions within the secure element wherein only the production area is configured to execute or install the software and the role of the temporary staging area is limited only to storing the software, more particularly the updated software. It will be apparent to a person skilled in that such a configuration of the memory of the secure element may be achieved by adding/modifying the underlying computer program code of the secure element by a person skilled in the art. The advantage of using a temporary staging area is that the updated software can be stored there until the NFC mobile device 302 returns to the MNO's OTA network or established a connection therewith. Only when the NFC mobile device 302 is back on the MNO's OTA network, will the NFC mobile device be able to signal to the distribution server that the downloaded updated software can be updated. The distribution server then initiates the installation of the update as described above.

According to the aforementioned embodiment of the invention, since the distribution of the updated software to be installed on the NFC mobile devices from the distribution server to the NFC reader is through the internet network therebetween, a significant OTA bandwidth of the MNO is spared which otherwise would have been clogged with a large scale distribution of the software updates. The only OTA MNO bandwidth which is used, according to the aforementioned embodiments, is for installing the update software on the secure elements of the NFC mobile devices. This results in a significant bandwidth usage of the MNO OTA which in turn can be used to provide better services to the subscribers of the NFC services.

The flowchart and block diagrams in the Figures illustrate the architecture, functionality, and operation of possible implementations of systems, methods and NFC enabled mobile devices according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing distribution of software updates in near field communication (NFC) mobile devices, the method comprising:
   retrieving information of one or more softwares in one or more NFC mobile devices by a NFC reader in communication range with the one or more NFC mobile devices;
   transmitting the retrieved information from the NFC reader to a distribution server which determines if the one or more softwares require an update based on the retrieved information;

in response to said determination, receiving an available updated software or update components of the one or more softwares transmitted from the distribution server to the NFC reader; and transmitting the available updated software or updated components of the one or more softwares from the NFC reader to a temporary staging area of a secure element of the one or more NFC mobile devices whose one or more softwares require the update, wherein the updated software or update components are moved from the temporary staging area to a production area of the secure element by the distribution server, and the installation of the updated software or update components in the production area of the secure elements is initiated by the distribution server, wherein the temporary staging area and production area are memory partitions of the secure elements.

2. The method of claim 1, wherein the retrieval includes requesting and receiving the information from the NFC mobile device.

3. The method of claim 1, wherein the information includes information regarding the one or more softwares and a distribution server identifier thereof.

4. The method of claim 3, wherein the software information is transmitted to the distribution server identified from the distribution server identifier.

5. The method of claim 1, wherein the updated software or update components received from the distribution server by the NFC reader is cryptographically protected.

6. The method of claim 1, wherein the updated software or update components are verified before storing in the temporary and production staging areas by verification applications installed in the temporary and production staging areas respectively.

7. The method of claim 1, wherein the softwares includes an operating system of the NFC mobile device and mobile applications in the NFC mobile device.

8. A computer program product comprising a non-transitory computer usable storage medium having readable program code embodied in the storage medium, the computer program product comprises at least one component operable to:

retrieve information of one or more softwares in one or more near field communication (NFC) mobile devices by a NFC reader in communication range with the one or more NFC mobile devices;

transmit the retrieved information from the NFC reader to a distribution server which determines if the one or more softwares require an update based on the retrieved information;

in response to said determination, receive an available updated software or update components of the one or more softwares from the distribution server to the NFC reader; and transmit the available updated software or updated components of the one or more softwares from the NFC reader to a temporary staging area of a secure element of the one or more NFC mobile devices whose one or more softwares require the update, wherein the updated software or update components are moved from the temporary staging area to a production area of the secure element by the distribution server, and the installation of the updated software or update components in the production area of the secure elements is initiated by the distribution server, wherein the temporary staging area and production area are memory partitions of the secure elements.

9. The computer program product of claim 8, wherein the retrieval includes requesting and receiving the information from the NFC mobile device.

10. The computer program product of claim 8, wherein the information includes information regarding the one or more softwares and a distribution server identifier thereof.

11. The computer program product of claim 10, wherein the software information is transmitted to the distribution server identified from the distribution server identifier.

12. The computer program product of claim 8, wherein the updated software or update components received from the distribution server by the NFC readers is cryptographically protected.

13. The computer program product of claim 8, wherein the updated software or update components are verified before storing in the temporary and production staging areas by verification applications installed in the temporary and production staging areas respectively.

14. The computer program product of claim 13, wherein the softwares includes an operating system of the NFC mobile device and mobile applications in the NFC mobile device.

* * * * *